C. BOSCH & W. WILD.
PURIFICATION OF HYDROGEN.
APPLICATION FILED DEC. 4, 1913
1,133,087.
Patented Mar. 23, 1915.
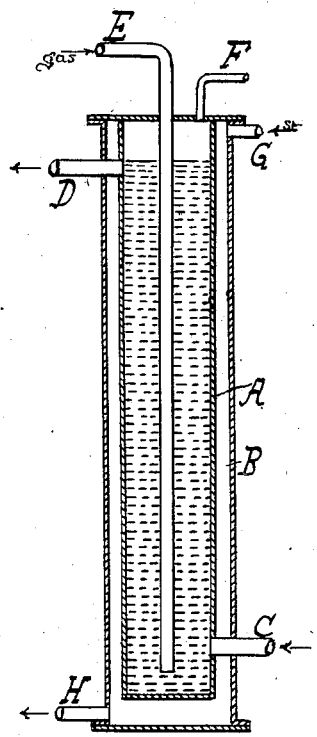

UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PURIFICATION OF HYDROGEN.

1,133,087. Specification of Letters Patent. Patented Mar. 23, 1915.

Application filed December 4, 1913. Serial No. 804,669.

*To all whom it may concern:*

Be it known that we, CARL BOSCH and WILHELM WILD, citizens of the German Empire, residing at Ludwigshafen-on-the-Rhine, Germany, have invented new and useful Improvements in the Purification of Hydrogen, of which the following is a specification.

We have found that by treating hydrogen (under which term we include both hydrogen itself and also mixtures of hydrogen with other gases) under pressure exceeding that of five atmospheres with a hot solution of fixed caustic alkali, sulfur and compounds containing sulfur can be practically completely removed therefrom. The concentration of the alkaline solution and the temperature and pressure employed can be varied within wide limits, and the invention is not limited to any particular details in these respects. As an example, however, we may say that a caustic soda solution of from 10% to 50% can be employed at a temperature of from 150° to 225° C. and a pressure of 50 atmospheres. As a rule, if higher pressures be employed, the gases can be passed through the caustic alkali solution with a greater velocity while still effecting a total separation of all sulfur and sulfur compounds.

The drawing accompanying this specification illustrates in vertical section one form of apparatus whereby our process may be carried into effect, but we do not limit our process to the use of the apparatus shown.

In the said drawing A represents an absorption cylinder containing hot caustic soda solution, which solution is pumped into the cylinder through the pipe C and leaves through the pipe D. The gases containing hydrogen which are to be purified are pumped under pressure through the pipe E, bubble through the column of liquid in the absorption cylinder A and leave in a purified condition through the pipe F. Surrounding the absorption cylinder A is a jacket B and into this jacket steam is passed through the pipe G, in order to heat up the caustic soda solution to the necessary temperature. The condensed water and any surplus steam leave the jacket through the pipe H. The hydrogen, or gases containing hydrogen, thus purified can be used for any purpose to which it is, or they are, applicable, for instance for the catalytic production of ammonia or for the hydrogenization of organic compounds or for the production of methane for carbon monoxid.

Now what we claim is:—

1. The process of freeing hydrogen from sulfur by treating hydrogen containing sulfur under a pressure exceeding that of five atmospheres with a hot solution of fixed caustic alkali.

2. The process of freeing hydrogen from sulfur by treating hydrogen containing sulfur and at a pressure of fifty atmospheres with 10% to 50% solution of caustic soda maintained at a temperature of from 150° to 225° C.

In testimony whereof we have hereunto set our hands in the presence of two subscribing witnesses.

CARL BOSCH.
WILHELM WILD.

Witnesses:
  J. ALEC. LLOYD,
  S. S. BERGER.